(12) United States Patent
Parupudi et al.

(10) Patent No.: US 8,327,132 B2
(45) Date of Patent: Dec. 4, 2012

(54) AUTOMATED CERTIFICATE PROVISIONING FOR NON-DOMAIN-JOINED ENTITIES

(75) Inventors: Gopal Parupudi, Sammamish, WA (US); Jagannatha Raju Dantuluri, Sammamish, WA (US); Prabhu Padhi, Sammamish, WA (US); Ram Sunkara, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1402 days.

(21) Appl. No.: 11/679,181

(22) Filed: Feb. 26, 2007

(65) Prior Publication Data

US 2008/0209207 A1    Aug. 28, 2008

(51) Int. Cl.
*G06F 21/00* (2006.01)

(52) U.S. Cl. .......................................................... 713/157

(58) Field of Classification Search .................. 713/155, 713/156, 175, 182, 185
See application file for complete search history.

(56) References Cited

U.S. PATENT DOCUMENTS

2004/0162786 A1 * 8/2004 Cross et al. ................... 705/59
2007/0055867 A1 * 3/2007 Kanungo et al. ............. 713/156

* cited by examiner

*Primary Examiner* — Jeffrey Pwu
*Assistant Examiner* — Anthony Brown
(74) *Attorney, Agent, or Firm* — Lee & Hayes, PLLC

(57) ABSTRACT

A method of certificate provisioning is provided for entities that are not associated with a domain. In some implementations, certificate provisioning methods allow non-domain-joined entities to request and receive certificates through an automated process with a certificate provisioning portal. Through the automated process, the identity of the client may be verified using security identity information. The security identity information may include a pre-shared secret or a previously issued certificate from a trusted Certificate Authority.

17 Claims, 3 Drawing Sheets

AUTOMATED CERTIFICATE PROVISIONING FOR NON-DOMAIN-JOINED ENTITIES

BACKGROUND OF THE INVENTION

Digital certificates are becoming popular and common for authentication and authorization of entities, such as non-domain-joined clients in a network. The entity typically must prove its identity, or authenticate itself, as a precondition for receiving the service from the server. The entity may authenticate using a digital certificate. As an example, the server may provide "management" services like hardware or software inventory, software distribution, patch management, OS imaging, compliance monitoring/management, status reporting and so forth.

The digital certificate includes information indicating that the entity is trusted by an independent source known as a Certificate Authority (CA). The Certificate Authority may generate the certificate by signing the entity's public key with its own private key to establish that the certificate was issued from that particular Certificate Authority and not an imposter. If the Certificate Authority is trusted by the server, the certificate will serve as confirmation that each entity is in fact who it says it is. Certificates are supported on a variety of platforms, hardware, and operating systems. Examples are Windows-based computers, handheld electronic data devices, embedded computers, mobile phones, smart cards and so forth.

Today, certificate provisioning and maintenance are integrated with security identity management systems such as, for example, Active Directory®, available from Microsoft® Corporation of Redmond, Wash. These systems typically use the domain identity of the client as a basis for certificate issuance, renewal, and other purposes. For example, a computer can be joined to a domain by using "special domain join" or "Domain User" credentials. These domain join credentials are set by the administrator. The administrator may set one or many domain join credentials per domain. These need to be provided in order to join the domain. An example is a Change Configuration Management product like System Center Configuration Manager (SCCM) 2007, also available from Microsoft® Corporation of Redmond, Wash. SCCM 2007 manages various clients including Windows® desktops, laptops, servers, mobile phones, personal digital assistants, embedded-devices, non-Windows® operating system devices, and the like. When these clients are domain-joined, a classic public key infrastructure (PKI) can provide certificate management and identity verification for them.

SUMMARY OF THE INVENTION

This Summary is provided to introduce a selection of certificate provisioning concepts in a simplified form that are further described below in the detailed description. This Summary is not intended to identify key features or essential features of the claimed subject matter, nor is it intended to be used as an aid in determining the scope of the claimed subject matter.

In view of the above, this disclosure describes a method of certificate provisioning of entities that are not associated with a domain. In some implementations described herein, certificate provisioning methods allow non-domain-joined entities to request and receive through an automated process certificates based on security information, such as a pre-shared secret, user credentials, or a previously issued certificate from a trusted Certificate Authority.

In one implementation, a method includes receiving a request from a non-domain-joined client entity for a certificate from a Certificate Authority. The identity of the non-domain-joined client entity is verified through an automated process. A request is sent to the Certificate Authority to issue a certificate to the non-domain-joined client entity. The certificate is received from the Certificate Authority, and is provided to (and provisioned on) the non-domain-joined client entity.

DETAILED DESCRIPTION

Overview

Many clients have no domain identity, but still require authentication for certain services. For example, cell phones, handheld devices, such as personal digital assistants (PDAs), and other machines do not have domain identities. A server communicating with the non-domain-joined entity will encounter more difficulties relying on certificates as a means of authentication and authorization. For example, unlike the automated system for certificate provisioning available to domain joined entities, the non-domain-joined entities have to be provisioned manually. Manual provisioning is very expensive in terms of time required by a technician to access the machine and to install the certificate. The process is also fraught with failure because expiration or near expiration of the certificate may not be detected. The client may then fail to receive the service for failure to authenticate.

In some implementations described herein, automated certificate provisioning allows a non-domain-joined entity to obtain a certificate through an automated certificate provisioning portal. The certificate provisioning portal may allow for automated provisioning of certificates by interfacing with a certificate enrollment agent installed on the entity and with a Certificate Authority. The portal relies on certain secure identity information from the entity as a basis for requesting the certificate from the Certificate Authority. If the secure identity information is adequate, the certificate provisioning portal sends a request to the Certificate Authority to issue the certificate. The portal then receives the certificate and provides it to the entity. The portal also may have a plug-in architecture to enable the portal to interact with other certificate authorities. The certificate may be supported on a variety of platforms, hardware, and operating systems. Examples are Windows-based computers, handheld electronic data devices, embedded computers, mobile phones and so forth.

Exemplary System

Figure 1:
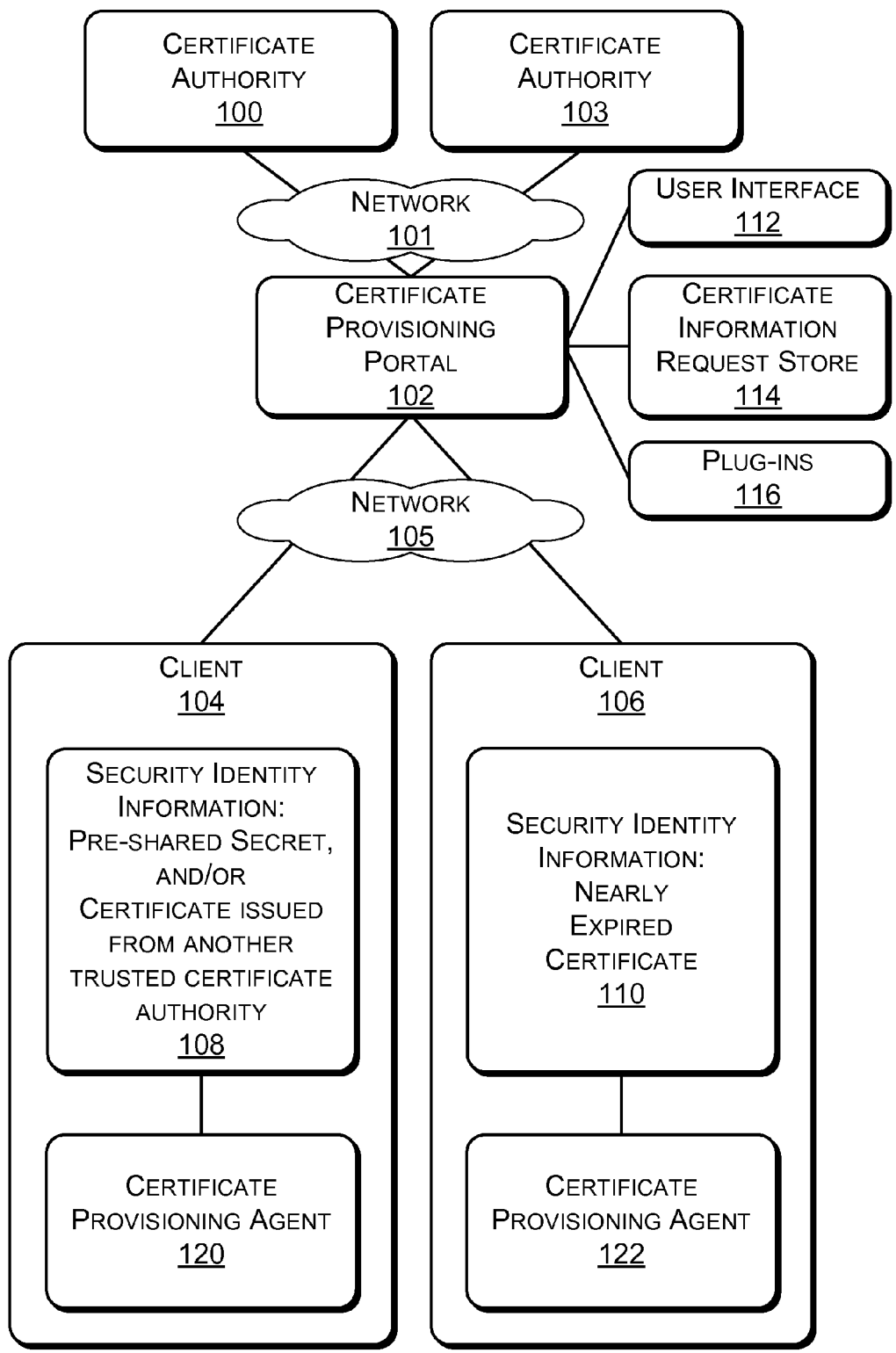
FIG. 1 shows an exemplary system for provisioning certificates issued from a Certificate Authority to a non-domain-joined-entity through the use of a certificate provisioning portal.

FIG. 1 shows one exemplary system for issuing certificates to a client that is not a domain joined entity, i.e., the client does not have a domain identity. A Certificate Authority 100 may be an entity, such as a person, software, hardware, and/or one or more computer readable media, that issue(s) certificates to authenticate client entities. The Certificate Authority 100 may be a component belonging to an existing PKI infrastructure.

The Certificate Authority 100 receives certificate issuance requests from a certificate provisioning portal 102. The certificate provisioning portal 102 may be an entity, such as a person, software, and/or hardware, such as a computer readable medium, that provides certificate enrollment services to client machines, such as client entities 104 and 106. The certificate provisioning portal may be automated using software stored in memory accessible by the portal 102. The certificate enrollment services may be HTTPS secure sockets layer (SSL) based web services or other like services. A system administrator may maintain and oversee the operation of the Certificate Authority and/or certificate provisioning portal 102. The certificate provisioning portal 102 may be integrated with the Certificate Authority 100 or may communicate over a network 101.

Client entity 104 communicates over a network 105 with certificate provisioning portal 102 to request a certificate. Network 105 may be the same network as network 101, e.g., the Internet. In order to obtain a certificate, the client entity 104 provides certain security identity information 108 to the certificate provisioning portal 102. This security identity information 108 may include a pre-shared secret, user credentials, or a certificate issued from another Certificate Authority. The pre-shared secret may be a password or a username/password combination. The certificate issued from another Certificate Authority may be provided to the client on a smartcard or other computer-readable media, electronically over a network connection, or in any other suitable way. Other examples of security identity information may include Windows® credentials, credentials of the host-machine to which the client entity is attached, and so forth.

The certificate provisioning portal 102 may be configured to determine which certificates issued by other certificate authorities (e.g. 103) are trustworthy, as well as whether given non-certificate security identity information is sufficient to establish trustworthy identity. If the certificate provisioning portal 102 determines the security identity information 108 is trustworthy, it communicates with the Certificate Authority 100 to request that a certificate be issued. The determination of identity and trustworthiness may be made based on a predetermined set of rules or logic. The rules and logic may be updated or changed periodically by a user. The certificate provisioning portal 102 thus reduces or removes the burden of determining the identity of an entity from the Certificate Authority 100 and allows the verification process to be automated.

The certificate provisioning portal 102 may also communicate with the client 106 to determine that a certificate 110, which was previously issued by the Certificate Authority 100, is about to expire. In that instance, the certificate provisioning portal 102 may determine identity and trustworthiness of the entity based on the certificate previously issued from that Certificate Authority 100. The certificate provisioning portal 102 may then communicate with the Certificate Authority 100 to request a new certificate.

The certificate provisioning portal 102 may have a user interface (UI) 112. The UI 112 may allow the administrator to approve information for security identity modules, to approve requests when necessary, perform auditing, add trusted Certificate Authorities and so forth. The certificate provisioning portal 102 may also have a database or certificate request store 114 for storing and maintaining pending certificate requests. This store 114 may also maintain logging and auditing information, such as what certificates have been requested and issued, by whom, when, and so forth. Furthermore, store 114 may contain any information required to confirm security identity information 108, such as shared secrets or rules for determining whether a certificate issued from another Certificate Authority should be trusted. For example, certificate request store 114 may store security identity modules for determining what security identity information to accept in establishing identity. The security identity modules may be software modules, programs, or the like.

The certificate provisioning portal may also have one or more plug-ins 116. The plug-ins 116 may allow the certificate provisioning portal to interface with certificate authorities from different PKI implementations, such as Certificate Authority 100 or Certificate Authority 103. The plug-ins 116 may be PKI implementation-specific and installed as part of any software component of the certificate provisioning portal 102. Alternatively, the plug-ins 116 may be provided by each PKI implementation and installed on the Certificate Authority 100 or 103 to support a standard interface that facilitates interaction with the certificate provisioning portal 102.

The client entities 104 and 106 also have certificate provisioning agents 120 and 122. The certificate provisioning agents 120 and 122 are responsible for certificate enrollment and renewal activities, such as communicating with the certificate provisioning portal, detecting that a certificate on a client entity, e.g., client 106, is about to expire and so forth. The agents may communicate with the certificate provisioning portal 102 to offer the security identity information 108 to the certificate provisioning portal 102 and to request a certificate from the Certificate Authority 100.

Exemplary Method

Figure 2:
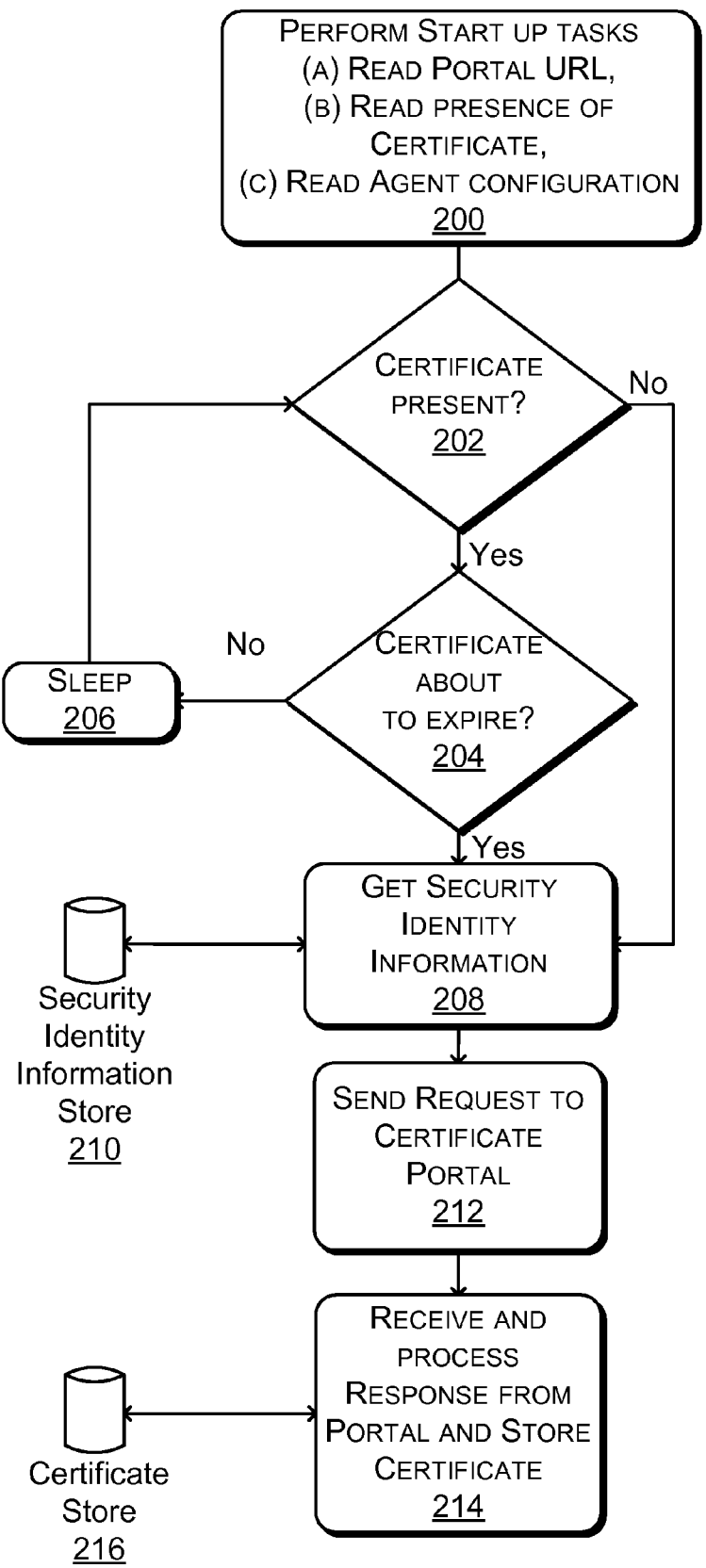
FIG. 2 shows a flow diagram of an exemplary process undertaken by a non-domain-joined entity in requesting a certificate.

FIG. 2 shows an exemplary process undertaken by a client entity to request and obtain a certificate from a Certificate Authority. The process may, but need not necessarily, be implemented using a system such as that shown in FIG. 1. First, the client entity may perform start up tasks (Block 200), such as determining from which Certificate Authority it will seek a certificate. The client entity may also determine which certificate provisioning portal will verify the client entity's identity and at what Uniform Resource Locator (URL) the certificate provisioning portal is located (Block 200). The client entity may also read the presence of a certificate and examine its agent configuration (Block 200). Other start up tasks may be performed, such as determining how frequently to seek certificate renewal and what kind of security identity information to provide to the certificate provisioning agent. The start up tasks could be configured manually or in any suitable manner.

After the start up tasks, the agent determines if a certificate is present (Block 202). If a certificate is found, the client determines whether the certificate is about to expire (Block 204). If the certificate is not going to expire in the near future, the certificate provisioning process is essentially complete and the client "sleeps" with regard to the certificate provisioning portal and Certificate Authority (Block 206). At this time, the client may proceed to request a service from a server or perform other authorized tasks using the certificate for authentication.

If no certificate is present or the certificate is about to expire, the client will obtain and provide the security identity information (Block 208) to the certificate provisioning authority. The security identity information may be provided by the user or stored on a security identity information store. The security identity information store may be located on the client entity, located with the certificate provisioning portal, or may be on an independent storage device accessible by the client entity and/or the certificate provisioning portal. The security identity information may take the form of a pre-shared secret, user credentials, a certificate that was issued by the Certificate Authority, or a certificate issued by another Certificate Authority that is trusted by the certificate provisioning portal. The client provides the security identity information to the certificate provisioning portal as part of a request that a certificate be issued (Block 210). The certificate provisioning portal sends a response to the client. The client receives and processes the response from the certificate provisioning portal (Block 212). If a certificate is issued by the Certificate Authority, it is stored on the client machine or other certificate store (Block 214).

In the event that a certificate has previously been issued from the Certificate Authority, but that certificate is about to expire, that certificate can be sent to the Certificate Authority portal as part of a request for a new certificate. Once a new certificate is issued, that certificate is stored on the client machine or other certificate store (Block 214).

Figure 3:
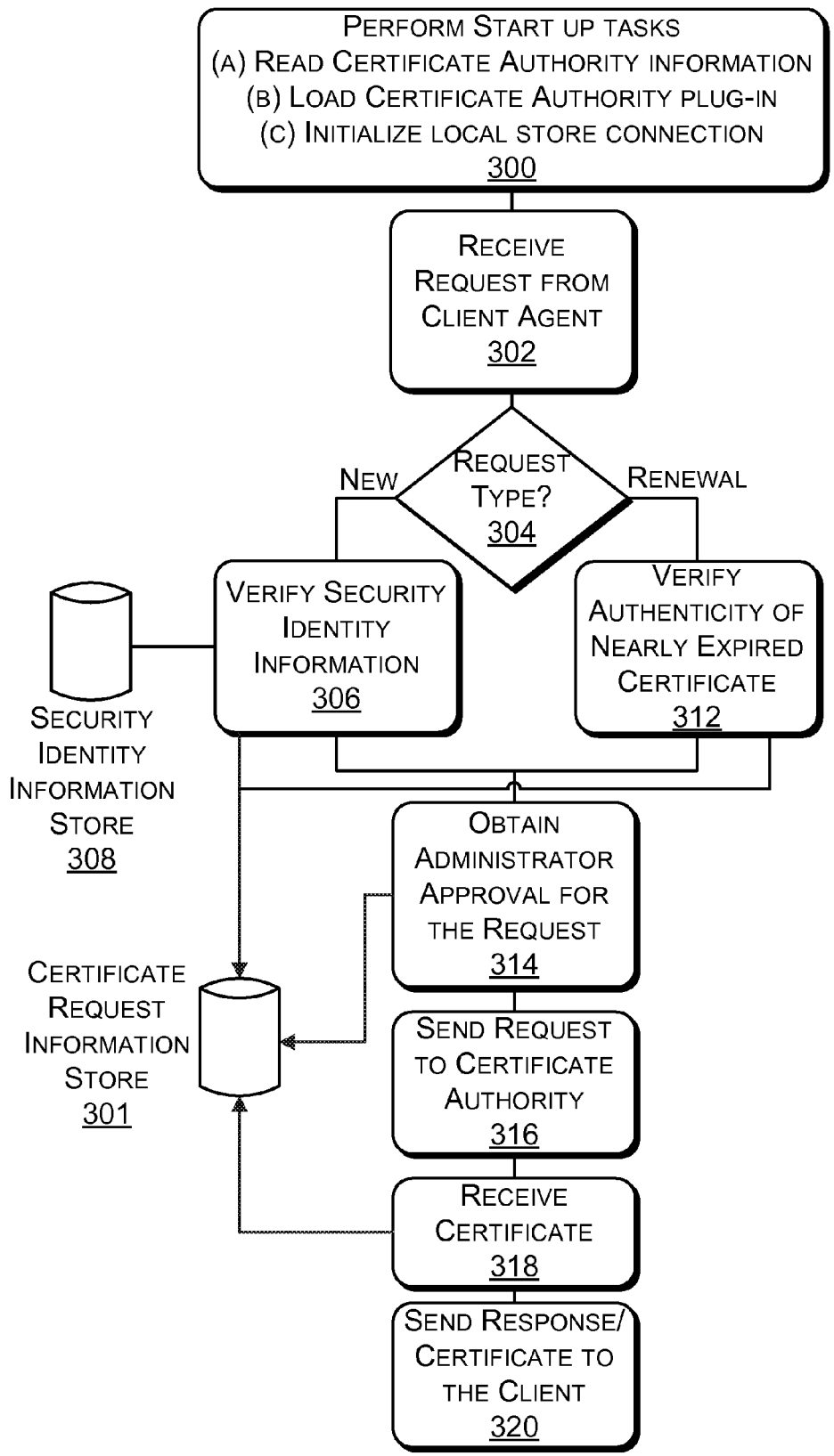
FIG. 3 shows a flow diagram of an exemplary process undertaken by the certificate portal in accepting the certificate request, verifying the identity of the entity through security information or a nearly expired certificate, submitting a request for the certificate from the Certificate Authority, and sending a response and/or the certificate to the entity in response to the certificate request.

FIG. 3 shows a flowchart of an exemplary procedure followed by a certificate provisioning portal, such as that shown in FIG. 1. The certificate provisioning portal may perform start-up tasks (Block 300). For example, the portal may read Certificate Authority information to determine which Certificate Authority it will interact with in making certificate requests. The certificate provisioning portal may load any plug-ins for communicating with certificate authorities (e.g. certificate authorities 100 and 103). These plug-ins may be located in a local memory associated with the certificate provisioning portal, on a server, or on a local or wide-area network. The certificate provisioning portal may also initialize a connection with the certificate request store so that the information stored in the certificate request store may be accessed during certificate requests. The certificate provisioning portal 102 may then wait for a client (e.g., client entity 104 or 106) to request a certificate.

When the client requests a certificate through its client agent, that request is received by the certificate provisioning portal (Block 302). The certificate provisioning portal may determine whether the client agent is requesting the renewal of a certificate previously issued by the Certificate Authority or if the client agent is requesting a certificate without a previously issued certificate, i.e., a "new" certificate request (Block 304).

If the request is a new request, the certificate provisioning portal may verify the security identity information provided by the client agent (Block 306) and store the information on a security identity information store (Block 308). The certificate provisioning portal may verify the security identity information by accessing and/or loading an appropriate security identity module, which is located in storage accessible to the certificate provisioning portal. The certificate provisioning portal may store this information on the certificate request information store (Block 310) for logging and auditing. The security identity information store and certificate request information store may be integrated or separate and may be located with the certificate provisioning portal or on any storage device or server accessible to the certificate provisioning portal.

If the request is a renewal request, the certificate provisioning portal may verify that the nearly expired certificate is genuine. (Block 312). The nearly expired certificate may be verified by accessing and/or loading the appropriate security identity module or more simply by verifying that the signature is that of the Certificate Authority. The certificate provisioning portal may log this information into a database, such as certificate request information store for logging and auditing (Block 310).

In some instances, administrator approval may be required before the certificate will be issued. For example, if the number of certificates permitted to be issued is limited to a certain number and that number of issued certificates has been reached, administrator approval may be required before any additional certificates are issued. Thus, after receiving a new or renewal request the certificate provisioning portal may seek administrator approval (Block 314), if necessary. Relevant information may then be stored on certificate request information store (Block 310).

If the security identity information or authenticity of the nearly expired certificate can be verified, and if the appropriate administrator approval is obtained, the certificate provisioning portal requests a certificate from the Certificate Authority (Block 316). The certificate provisioning portal receives the certificate (Block 318) and sends the certificate and/or a response to the client (Block 320). The actual certificate may be in the form of a .PFX file, which contains the private key. To prevent snooping over the wire and potential loss of the private key, SSL Server authentication may be used to talk to the portal. The issuance of the certificate may be logged on the certificate request information store (Block 310).

The certificate provisioning portal can record the type of security identity information that was used to verify the identity. For example, the certificate that is issued may be tagged to denote the type and/or level of security used to obtain the certificate. This may be done by a module or program associated with the certificate provisioning portal or with the Certificate Authority. A certificate that was obtained using a domain identity may be considered trustworthy. A certificate based on a pre-shared secret may be less trustworthy, as a pre-shared secret may be guessed or stolen. A server can use this information to make a determination of the type of service and level of service to provide. Thus, a server may be able to provide various levels of service to clients based on the level of security used to obtain the certificate.

Conclusion

Specifics of exemplary certificate provisioning methods are described above. However, it should be understood that certain acts of requesting and obtaining certificates from a certificate provisioning portal need not be performed in the order described, may be modified, and/or may be omitted entirely, depending on the circumstances. For example, storing certain information on the certificate information store may be omitted from the method, and/or may be performed alone without any other of the acts described above.

Moreover, any of the acts described above may be implemented by a computer, processor or other computing device based on instructions stored on one or more computer-readable media. As discussed above, computer-readable media can be any available media that can be accessed by a computing device to implement the instructions stored thereon.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method comprising:
employing a processor that executes instructions defined in, stored in and retained in a computer-memory, the instructions when executed by the processor implement at least the following operations:
receiving a request from a non-domain-joined client entity for a certificate to be issued by a Certificate Authority;
distinguishing between a request for a renewal of a certificate previously issued by the Certificate Authority and a request for a new certificate where no certificate was previously issued by the Certificate Authority, and based on the distinguishing:
verifying, when the request is for a renewal a certificate previously issued by the Certificate Authority, authenticity of the certificate previously issued certificate in a nearly expired condition; or
verifying, when the request is for a new certificate, an identity of the non-domain-joined client entity through a pre-shared secret provided by the non-domain-joined client entity or through an automated process, the automated process comprising accepting security identity information from the non-domain-joined client, the security identity information including a certificate previously issued by the Certificate Authority or a certificate issued by a different trusted Certificate Authority;
sending a request to a Certificate Authority to issue a certificate to the non-domain-joined client entity;
receiving the certificate from the Certificate Authority; and
providing the certificate to the non-domain-joined client entity.

2. A method as recited in claim 1, wherein receiving the request from the non-domain-joined client, verifying the identity of the non-domain-joined client entity, sending the request to the Certificate Authority and receiving the certificate are performed using a certificate provisioning portal.

3. A method as recited in claim 2, further comprising loading a plug-in on the certificate provisioning portal for communicating with the Certificate Authority.

4. The method of claim 2, wherein a plug-in is loaded on the Certificate Authority for communicating with the certificate provisioning portal.

5. A method as recited in claim 1, further comprising associating a level of security to the issued certificate based on a predetermined trustworthiness of the security identity information.

6. A method as recited in claim 1, further comprising storing information relating to:
verifying the identity of the non-domain-joined client entity, and receiving the certificate from the Certificate Authority.

7. One or more computer-readable storage media device having computer-readable instructions defined, stored and retained thereon that, when executed by a computer, cause the computer to perform acts comprising:
receiving a request from a non-domain-joined client entity for a certificate from a Certificate Authority;
distinguishing between a request for a renewal of a certificate previously issued by the Certificate Authority and a request for a new certificate where no certificate was previously issued by the Certificate Authority, and based on the distinguishing:
verifying, when the request is for a renewal a certificate previously issued by the Certificate Authority, authenticity of the certificate previously issued certificate in a nearly expired condition; or
verifying, when the request is for a new certificate, the identity of the non-domain-joined client entity based on security identity information provided by the non-domain-joined client entity consisting of a pre-shared secret, user credentials, a certificate previously issued by the Certificate Authority, or a certificate issued by a different but trusted Certificate Authority;
sending the request to the Certificate Authority to issue a certificate to the non-domain-joined client entity;
receiving the certificate issued from the Certificate Authority; and
sending the certificate to the non-domain-joined client entity.

8. The one or more computer-readable storage media as recited in claim 7, wherein the computer-readable instructions, when executed by a computer, cause the computer to store information related to the certificate request and to the issuance of the certificate.

9. The one or more computer-readable storage media as recited in claim 7, wherein the computer-readable instructions, when executed by the computer, cause the computer to load a plug-in for facilitating communication between the software and the Certificate Authority.

10. The one or more computer-readable storage media as recited in claim 9, wherein the plug-in is a PKI implementation-specific plug-in.

11. The one or more computer-readable storage media as recited in claim 7, further comprising computer-readable instructions that, when executed by the computer, cause the computer to associate a level of security to the issued certificate based on a predetermined trustworthiness of the identification information.

12. The one or more computer-readable storage media as recited in claim 7, further comprising computer-readable instructions that, when executed by the computer, cause the computer to automatically renew the certificate based on the original issuance of the certificate.

13. A certificate provisioning portal comprising:
an interface for accepting a request from a non-domain-joined client entity for a certificate from a Certificate Authority;
memory storing computer-readable instructions for:
distinguishing between a request for a renewal of a certificate previously issued by the Certificate Authority and a request for a new certificate where no certificate was previously issued by the Certificate Authority;
when a renewal certificate is indicated, then verifying that a nearly expired certificate to be renewed is genuine; and
when a new certificate is indicated, then automatically verifying the identity of the non-domain-joined client entity based on security identity information provided by the non-domain-joined client entity, the security identity information including a pre-shared secret or a certificate issued by another Certificate Authority that is trusted by the certificate provisioning portal; and
plug-in compatible architecture for interacting with the Certificate Authority to request the certificate from the Certificate Authority.

14. The certificate provisioning portal as recited in claim 13, further comprising a plug-in for facilitating communication between the portal and one or more certificate authorities.

15. The certificate provisioning portal as recited in claim 13, wherein the certificate provisioning portal and the Certificate Authority are integrated.

16. The certificate provisioning portal as recited in claim 13, further comprising a module for associating a level of security to the issued certificate based on a predetermined credibility of the security identity information.

17. The certificate provisioning portal as recited in claim 13, further comprising automatically renewing the certificate based on the original issuance of the certificate.

* * * * *